US012193122B2

(12) United States Patent
Snider et al.

(10) Patent No.: US 12,193,122 B2
(45) Date of Patent: Jan. 7, 2025

(54) VEHICULAR WINDOW ASSEMBLY WITH SOLDERLESS ELECTRICAL CONNECTION TO HEATER GRID

(71) Applicant: Magna Mirrors of America, Inc., Holland, MI (US)

(72) Inventors: Darin J. Snider, Holland, MI (US); Benjamin J. Wolters, Hudsonville, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 378 days.

(21) Appl. No.: 17/654,409

(22) Filed: Mar. 11, 2022

(65) Prior Publication Data

US 2022/0295603 A1 Sep. 15, 2022

Related U.S. Application Data

(60) Provisional application No. 63/202,043, filed on May 25, 2021, provisional application No. 63/200,501, filed on Mar. 11, 2021.

(51) Int. Cl.
*H01R 13/52* (2006.01)
*H01R 13/24* (2006.01)
(Continued)

(52) U.S. Cl.
CPC ........... *H05B 3/86* (2013.01); *H01R 13/2407* (2013.01); *H01R 13/631* (2013.01);
(Continued)

(58) Field of Classification Search
CPC ...... H05B 3/86; H05B 3/06; H05B 2203/016; H05B 2203/011; H05B 3/84; H05B 2203/014; H01R 13/2407; H01R 13/631; H01R 25/162; H01R 2201/26; H01R 12/75; H01R 25/165; H01R 12/714; H01R 12/7041
See application file for complete search history.

(56) References Cited

U.S. PATENT DOCUMENTS 4,920,698 A 5/1990 Friese et al.
4,995,195 A 2/1991 Olberding et al.
(Continued)

*Primary Examiner* — Abdullah A Riyami
*Assistant Examiner* — Nelson R. Burgos-Guntin
(74) *Attorney, Agent, or Firm* — HONIGMAN LLP

(57) ABSTRACT

A vehicular window assembly includes a window panel having an inner surface and an outer surface, electrically conductive traces established at the inner surface of the window panel, a pair of busbars established at the inner surface and in electrical connection with respective portions of the electrically conductive traces, and an electrical connector affixed at each busbar and configured to electrically connect to a wire harness of a vehicle when the vehicular window assembly is installed at the vehicle. The electrical connector includes a bonding portion, a connecting terminal and a busbar-connecting portion. The connecting terminal is configured to electrically connect to the wire harness of the vehicle. The bonding portion is adhesively bonded at the window panel. The electrical connector is bonded at the window panel with the busbar-connecting portion electrically connected to the respective busbar without use of solder.

20 Claims, 17 Drawing Sheets

(51) Int. Cl.

| | |
|---|---|
| ***H01R 13/631*** | (2006.01) |
| ***H01R 25/16*** | (2006.01) |
| ***H05B 3/06*** | (2006.01) |
| ***H05B 3/86*** | (2006.01) |

(52) U.S. Cl.

CPC ............. *H01R 25/162* (2013.01); *H05B 3/06* (2013.01); *H01R 2201/26* (2013.01); *H05B 2203/016* (2013.01)

(56) References Cited

U.S. PATENT DOCUMENTS

| | | | |
|---|---|---|---|
| 5,070,230 | A | 12/1991 | Osada et al. |
| 5,146,712 | A | 9/1992 | Hlavaty |
| 5,531,046 | A | 7/1996 | Kollar et al. |
| 5,551,197 | A | 9/1996 | Repp et al. |
| 5,572,376 | A | 11/1996 | Pace |
| 5,830,529 | A | 11/1998 | Ross |
| 5,853,895 | A | 12/1998 | Lewno |
| 6,068,719 | A | 5/2000 | Lewno |
| 6,119,401 | A | 9/2000 | Lin et al. |
| 6,319,344 | B1 | 11/2001 | Lewno |
| 6,691,464 | B2 | 2/2004 | Nestell et al. |
| 6,846,039 | B2 | 1/2005 | Lewno |
| 6,955,009 | B2 | 10/2005 | Rasmussen |
| 7,003,916 | B2 | 2/2006 | Nestell et al. |
| 7,073,293 | B2 | 7/2006 | Galer |
| 7,105,220 | B2 | 9/2006 | Freeman et al. |
| 7,184,190 | B2 | 2/2007 | McCabe et al. |
| 7,255,451 | B2 | 8/2007 | McCabe et al. |
| 7,274,501 | B2 | 9/2007 | McCabe et al. |
| 7,332,225 | B2 | 2/2008 | Lewno |
| 7,838,115 | B2 | 11/2010 | Lewno |
| 8,322,073 | B2 | 12/2012 | Lewno |
| 8,402,695 | B2 | 3/2013 | Smith et al. |
| 8,881,458 | B2 | 11/2014 | Snider et al. |
| 9,579,955 | B2 | 2/2017 | Snider |
| 9,624,707 | B2 * | 4/2017 | Gipson ............... E05D 15/0621 |
| 10,501,977 | B2 | 12/2019 | Snider et al. |
| 10,797,374 | B1 * | 10/2020 | Tengler .................. B60J 1/1853 |
| 10,843,644 | B2 | 11/2020 | Snider et al. |
| 2003/0213179 | A1 | 11/2003 | Galer |
| 2004/0020131 | A1 | 2/2004 | Galer et al. |
| 2004/0124659 | A1 | 7/2004 | Vaitus et al. |
| 2004/0245801 | A1 | 12/2004 | Gates et al. |
| 2005/0194805 | A1 | 9/2005 | Gates et al. |
| 2006/0107600 | A1 * | 5/2006 | Nestell ................ E05D 15/0621 49/413 |
| 2007/0029301 | A1 | 2/2007 | Tokiwa et al. |
| 2007/0046060 | A1 | 3/2007 | Werner |
| 2008/0127563 | A1 | 6/2008 | Tooker |
| 2010/0146859 | A1 * | 6/2010 | Gipson ................. E05F 15/632 49/348 |
| 2010/0193242 | A1 | 8/2010 | Derda et al. |
| 2011/0056140 | A1 | 3/2011 | Lewno |
| 2011/0233182 | A1 | 9/2011 | Baranski |
| 2011/0297661 | A1 | 12/2011 | Raghavan et al. |
| 2012/0091114 | A1 * | 4/2012 | Ackerman ............... H05B 3/84 49/70 |
| 2012/0117880 | A1 * | 5/2012 | Lahnala ................. B60J 1/1853 49/70 |
| 2012/0291353 | A1 * | 11/2012 | Gipson ................... B60S 1/026 49/70 |
| 2013/0174488 | A1 | 7/2013 | Snider et al. |
| 2015/0244089 | A1 | 8/2015 | Reul et al. |
| 2015/0314757 | A1 | 11/2015 | Bennett et al. |
| 2016/0001744 | A1 | 1/2016 | Sitterlet |
| 2016/0200241 | A1 | 7/2016 | Snider |
| 2016/0347036 | A1 | 12/2016 | Mellor et al. |
| 2017/0019955 | A1 | 1/2017 | Schulz et al. |
| 2017/0118803 | A1 | 4/2017 | Dimitrijevic et al. |
| 2017/0231034 | A1 | 8/2017 | Maclachlan |
| 2017/0238371 | A1 * | 8/2017 | Lahnala .................. E05F 15/60 219/203 |
| 2017/0246984 | A1 | 8/2017 | Snider |
| 2018/0227986 | A1 | 8/2018 | Snider et al. |
| 2018/0310366 | A1 | 10/2018 | Nelson et al. |
| 2019/0357316 | A1 * | 11/2019 | Douma .................. B60J 1/1846 |
| 2019/0383084 | A1 | 12/2019 | Snider et al. |
| 2021/0070241 | A1 | 3/2021 | Snider et al. |
| 2023/0084191 | A1 | 3/2023 | Snider et al. |

* cited by examiner

VEHICULAR WINDOW ASSEMBLY WITH SOLDERLESS ELECTRICAL CONNECTION TO HEATER GRID

CROSS REFERENCE TO RELATED APPLICATIONS

The present application claims the filing benefits of U.S. provisional application Ser. No. 63/202,043, filed May 25, 2021, and U.S. provisional application Ser. No. 63/200,501, filed Mar. 11, 2021, which are hereby incorporated herein by reference in their entireties.

FIELD OF THE INVENTION

The present invention relates to movable or slider window assemblies for vehicles and, more particularly to a side or rear slider window assembly for a vehicle having a heating element or feature.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. It is also known to provide a heating element at the window assembly to defog or defrost the window panels. The window panels typically include respective heater grids that are electrically connected to a power source and are heated responsive to actuation of a user input. The electrical connectors are soldered to the heater grids or busbars at the window panel.

SUMMARY OF THE INVENTION

A vehicular window assembly provides for defogging or defrosting of the window panel or panels of the window assembly via electrically conductive traces or heater grids at one or more window panels of the window assembly. The heater grids are disposed at a surface of the window panel and electrically conductive traces or busbars at which electrical connectors are disposed for electrically connecting the busbars and heater grids to a wire harness of the vehicle. The electrical connectors are disposed at and retained at the respective busbars via a solderless connection, such as via bonding a metal connector element directly to the window panel and/or via a cover or retaining element that is bonded to the window panel and that holds the metal connector element in place against the busbar at the surface of the window panel. The window assembly may comprise a fixed window panel and/or a movable window panel. For example, the window assembly may comprise a rear slider window assembly having a fixed window panel and a movable window panel, with both window panels heated or defogged via respective heater grids.

These and other objects, advantages, purposes and features of the present invention will become apparent upon review of the following specification in conjunction with the drawings.

DESCRIPTION OF THE PREFERRED EMBODIMENTS

Figure 1:
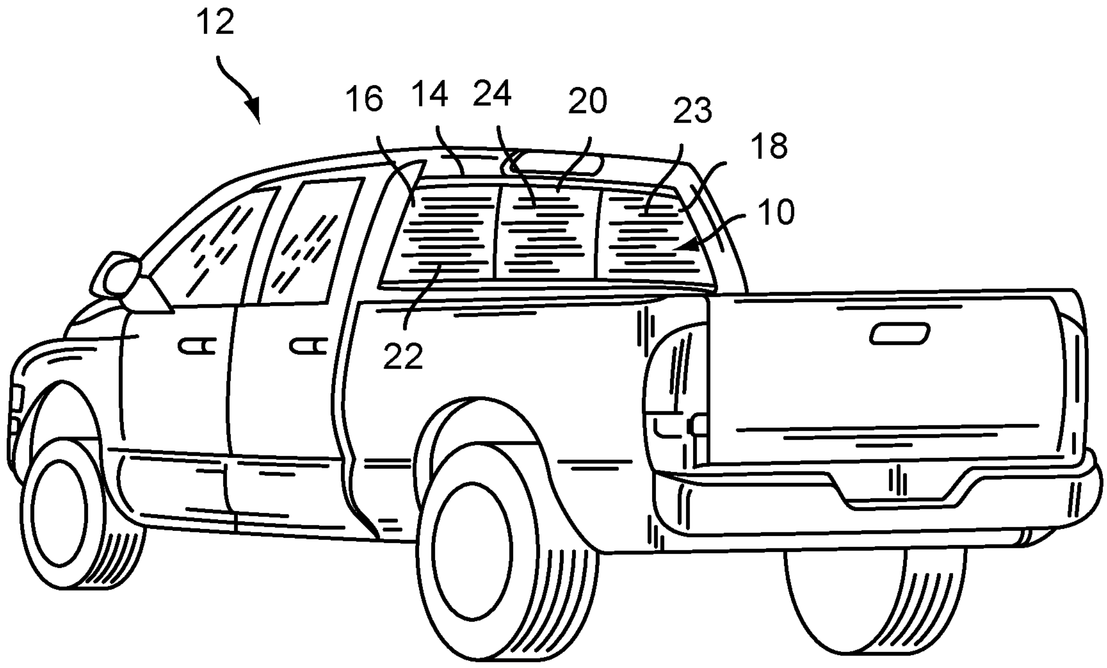
FIG. 1 is a rear perspective view of a pickup truck having a rear slider window assembly.
Figure 2:
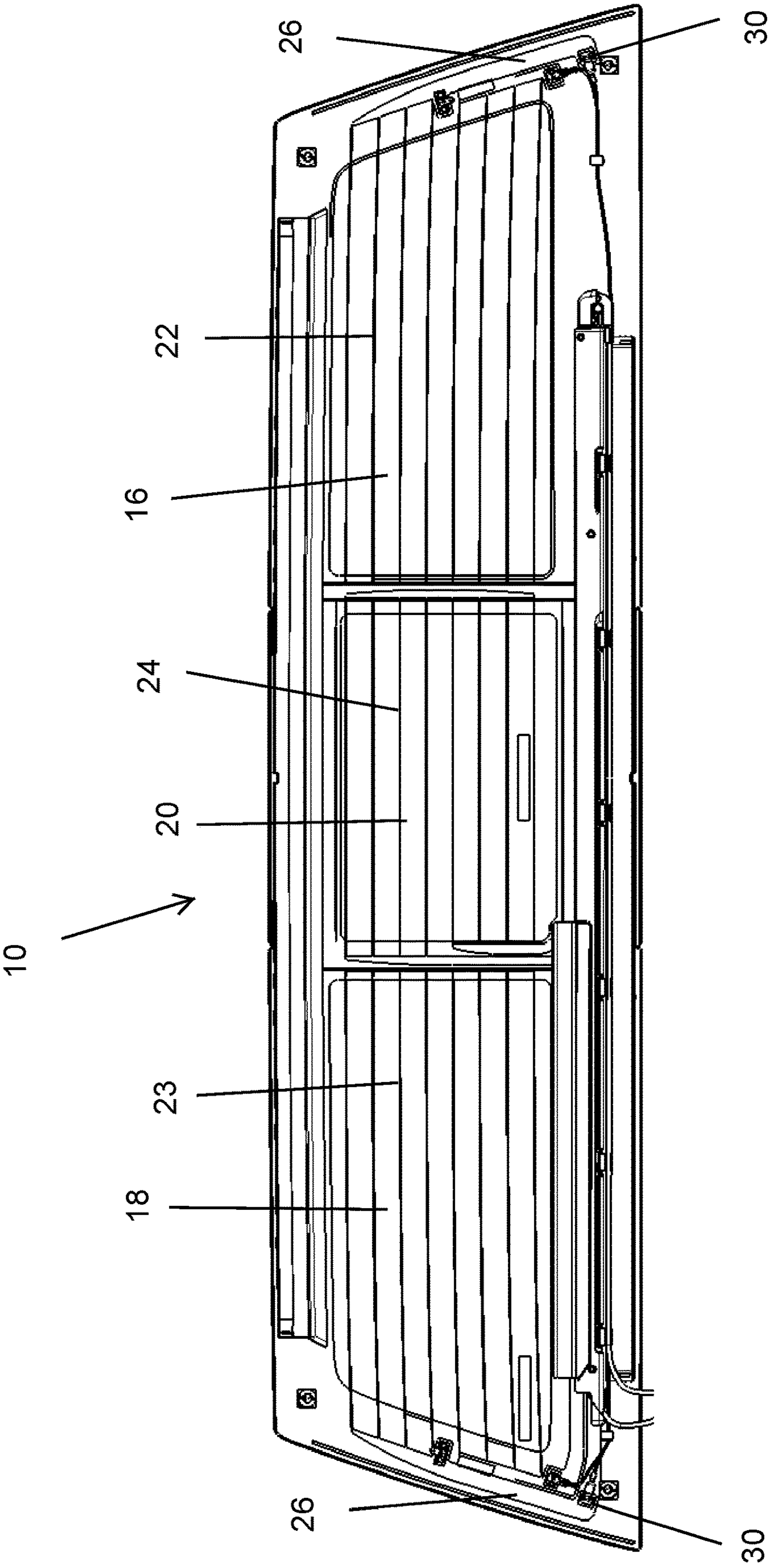
FIG. 2 is a plan view of the window assembly.

Referring now to the drawings and the illustrative embodiments depicted therein, a rear slider window assembly 10 of a vehicle 12 (such as a pickup truck or the like) includes a window frame 14 (having upper and lower rails), a pair of side fixed window panels 16, 18 and a movable window panel 20 that is movable relative to the frame 14 and the fixed window panels 16, 18 between an opened position and a closed position. The fixed window panels 16, 18 each include an electrically conductive heater grid 22, 23 or other heating element or electrically operable element established at the window panels (such as at or on an interior surface of the window panels) and the movable window panel 20 includes an electrically conductive heater grid or other heating element or electrically operable element 24 established at the window panel (such as at or on an interior surface of the movable window panel).

Figure 3:
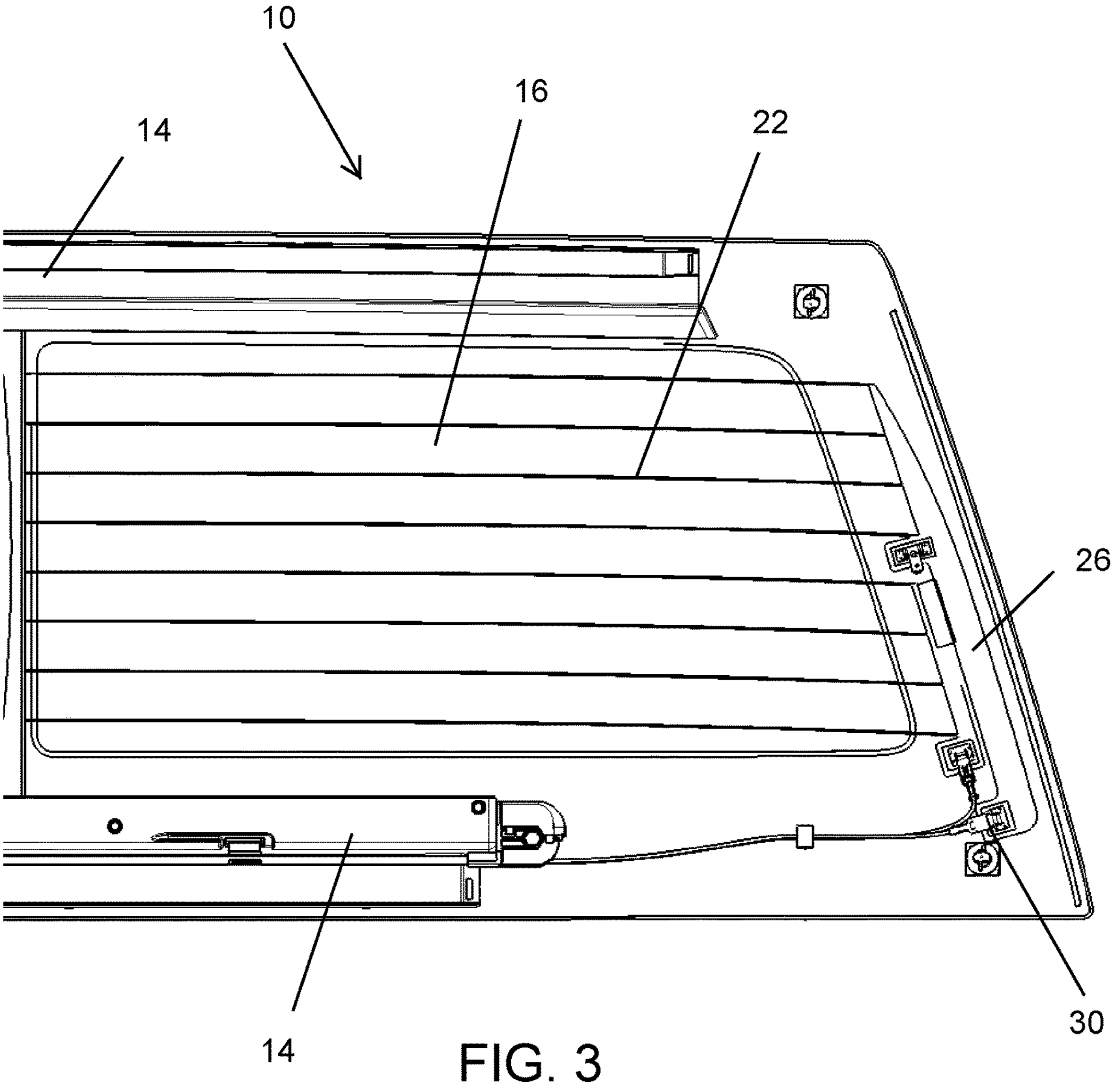
FIG. 3 is a plan view of a portion of the window assembly, showing the electrical connectors at the busbars of the heater grid.

The heater grids 22, 23 are electrically conductively connected to (or are otherwise in electrical conductive continuity with) a power source of the vehicle 12 and may be powered (such as responsive to a user actuatable input or switch or button of the vehicle or responsive to a sensor or accessory of the vehicle 12) to heat or defrost or defog the fixed window panels 16, 18. The movable panel heater grid 24 is electrically connected to the power source (and may be electrically connected to electrical terminals or elements at one of the heater grids 22, 23 of the fixed window panels 16, 18) and may be electrically powered to heat or defrost or defog the movable window panel 20. The heater grids include electrically conductive traces or busbars (such as busbars 26 in FIG. 3) established at the fixed window panels 16, 18. The electrically conductive traces and busbars 26 are electrically connected to a vehicle wire harness via respective electrical connectors 30 bonded at the window panel 20.

Figure 4:
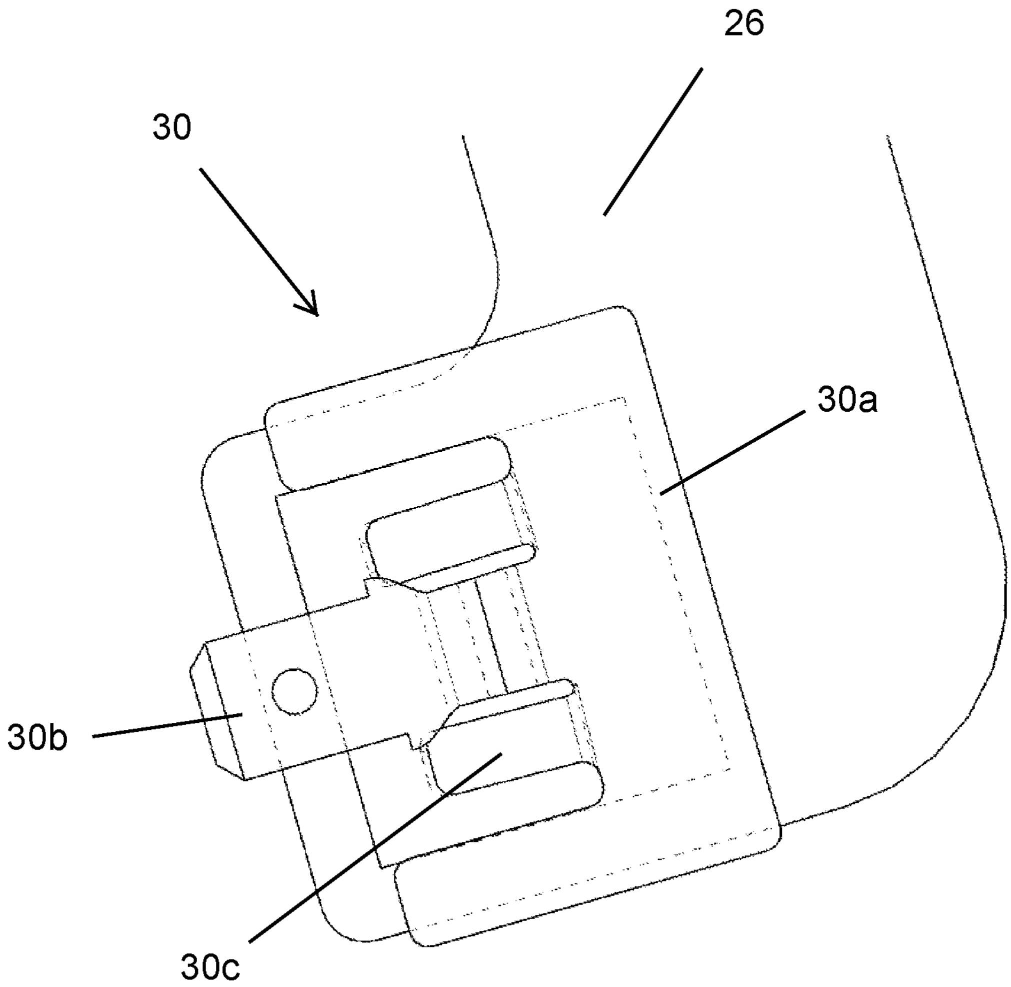
FIG. 4 is a plan view of one of the electrical connectors bonded to the busbar.
Figure 5:
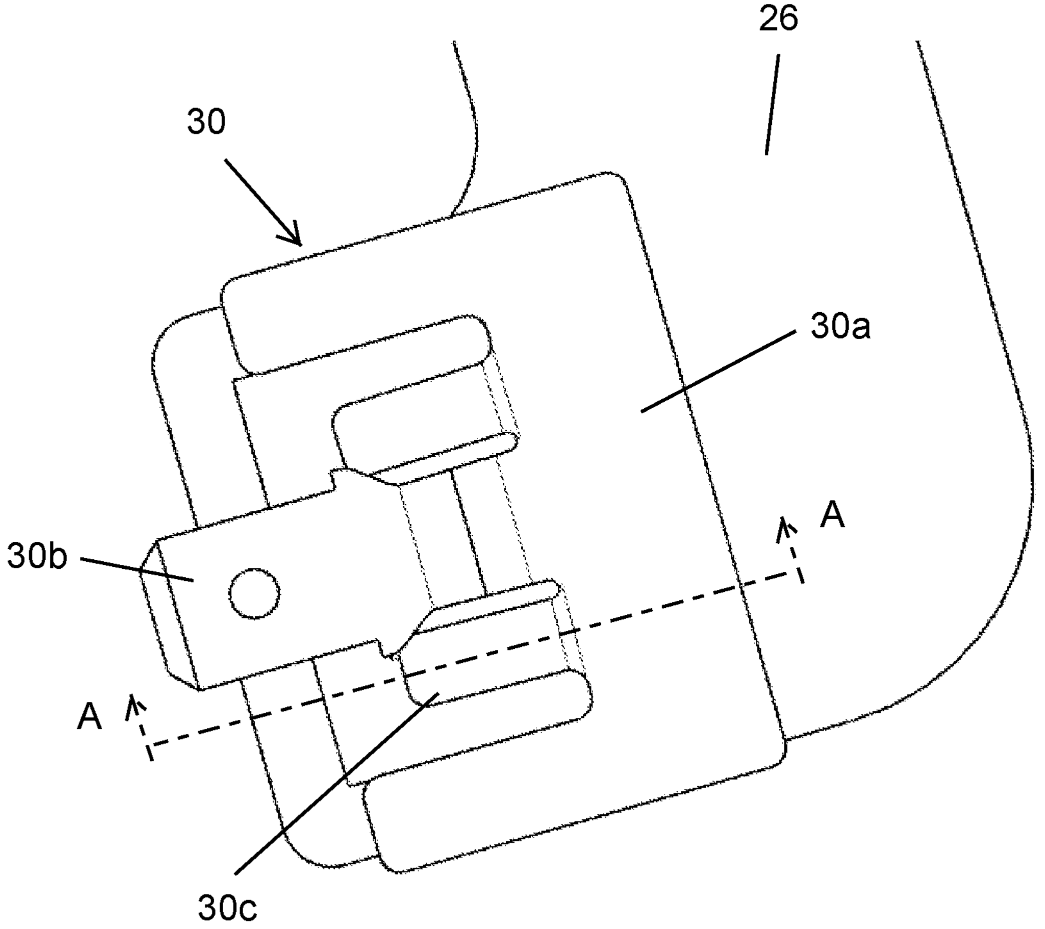
FIG. 5 is a plan view of an electrical connector disposed at the busbar.
Figure 5A:
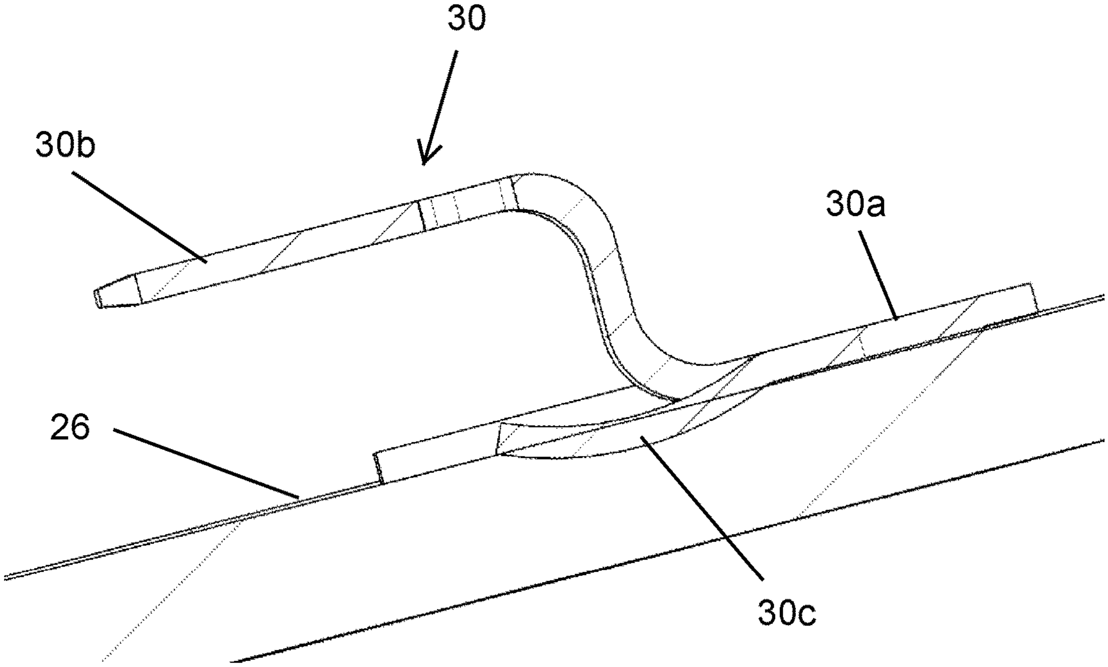
FIG. 5A is a sectional view of the electrical connector of FIG. 5, taken along the line A-A in FIG. 5.
Figure 6:
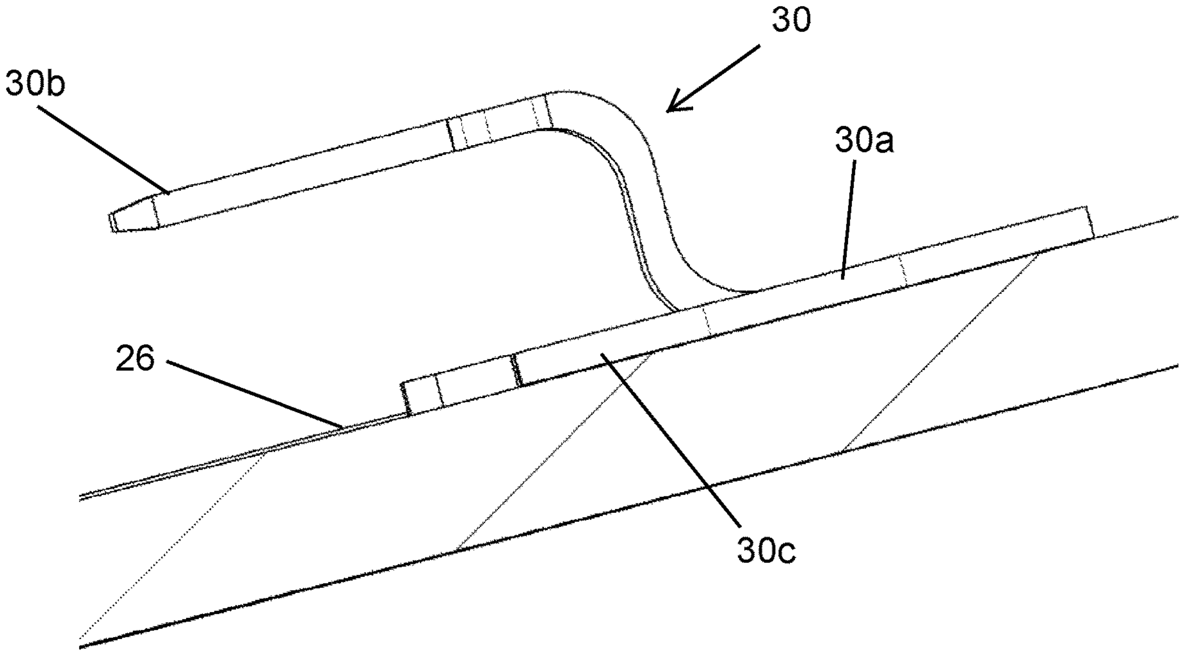
FIG. 6 is another sectional view of the electrical connector similar to FIG. 5A, but showing the electrical connector tabs flattened against the window panel and busbar.

In the illustrated embodiment of FIGS. 4-6, the electrical connector 30 comprises a metal connector element (such as formed via a metal stamping process) having a bonding or base portion 30*a* and a connecting terminal 30*b*. The base portion 30*a* is configured to adhesively attach or bond to the window panel 20 at the respective busbar 26. The connecting terminal 30*b* is configured to electrically connect to a connecting element of the wire harness (such as a spade terminal configured to plug into a receiving terminal of the wire harness). The electrical connector 30 further comprises a busbar-connecting portion that comprises a pair of flexible tabs 30*c* that are curved and biased toward an extended or curved state (as can be seen in FIG. 5A).

The base portion 30*a* of the electrical connector 30 is adhesively bonded to the window panel 20, such as at the glass surface and/or at the busbar 26. When the base portion 30*a* is bonded at the window panel 20, the tabs 30*c* contact the busbar 26 and are moved toward a flattened state (see FIG. 6) and are urged against the busbar 26 due to the inherent biasing of the tabs 30*c* toward the initial curved state (FIG. 5A) of the tabs 30*c*. Thus, the base portion 30*a* of the electrical connector 30 is adhesively bonded to the window panel 20 and the electrical connection of the electrical connector 30 at the busbar 26 is maintained and enhanced due to the bias of the tabs 30*c*, which are urged against the busbar 26 and electrically connect to the busbar 26 without use of solder at the electrical connection/joint. The electrical connector 30 may be bonded to the window panel 20 and/or busbar 26 via adhesive at the base portion 30*a* only, such that there is no adhesive disposed between the tabs 30*c* and the busbar 26 and such that the electrical connection is made via direct metal-to-busbar contact.

Figure 7:
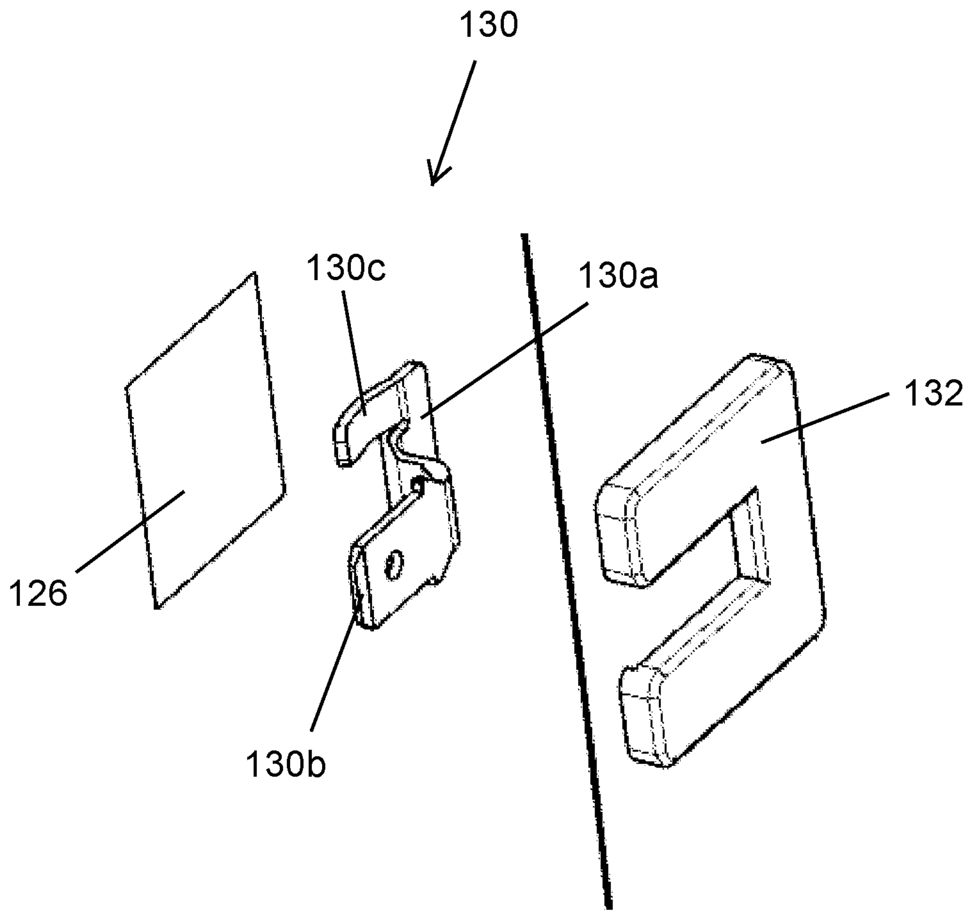
FIG. 7 is an exploded perspective view of another electrical connector, shown with a metal connector portion and a retaining cover.
Figure 8:
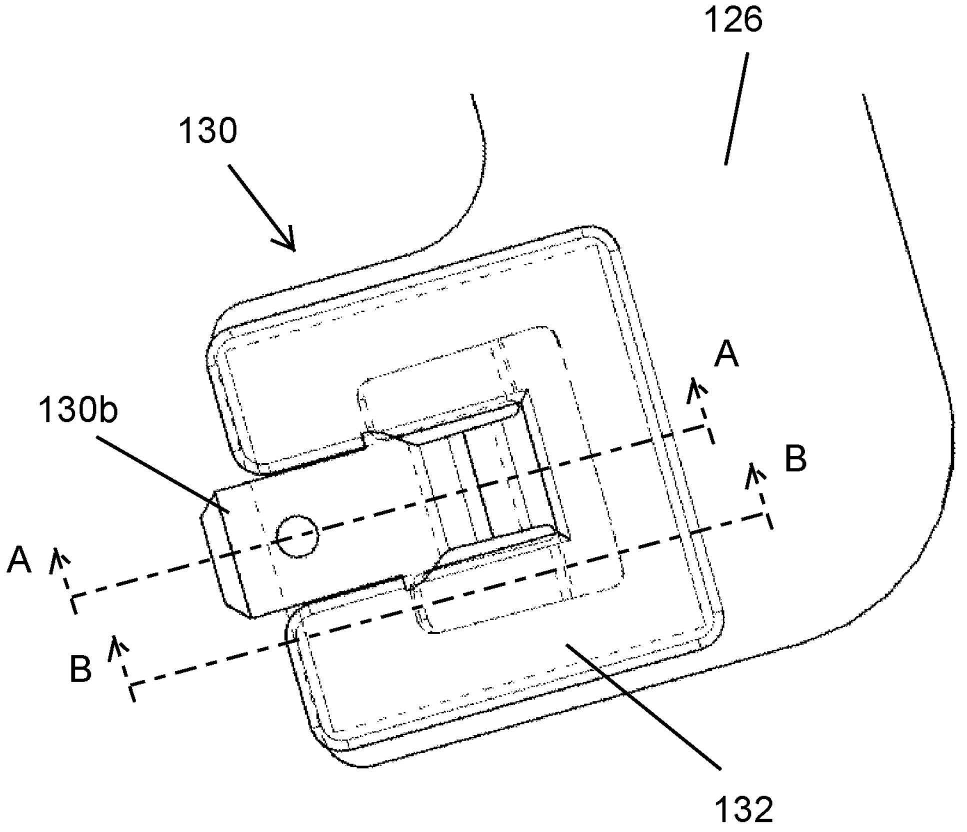
FIG. 8 is a plan view of the electrical connector of FIG. 7.
Figure 8A:
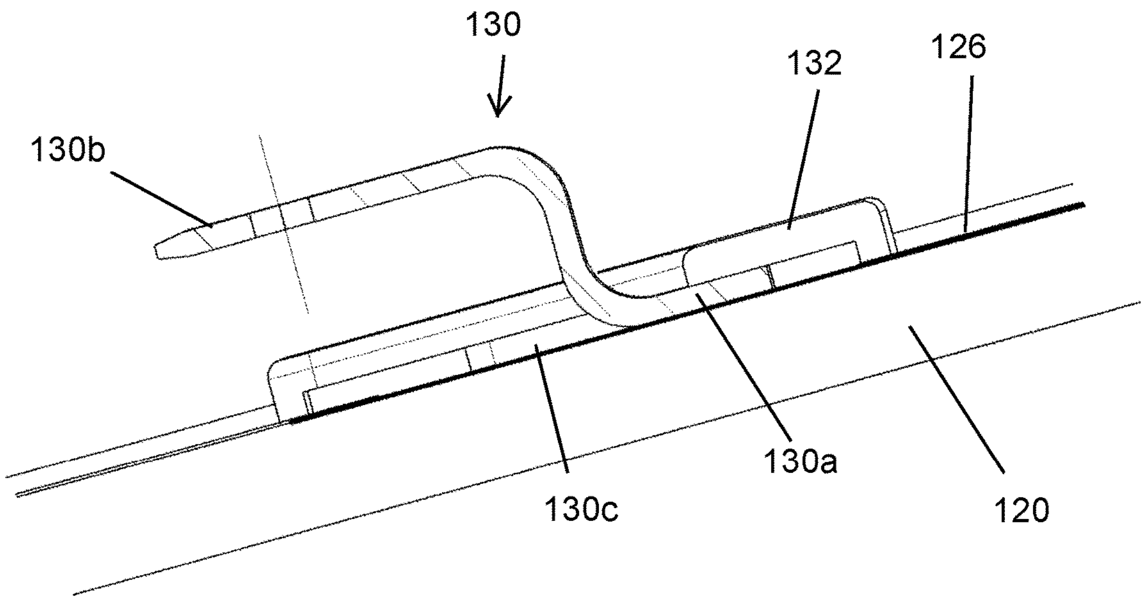
FIG. 8A is a sectional view of the electrical connector, taken along the line A-A in FIG. 8.
Figure 8B:
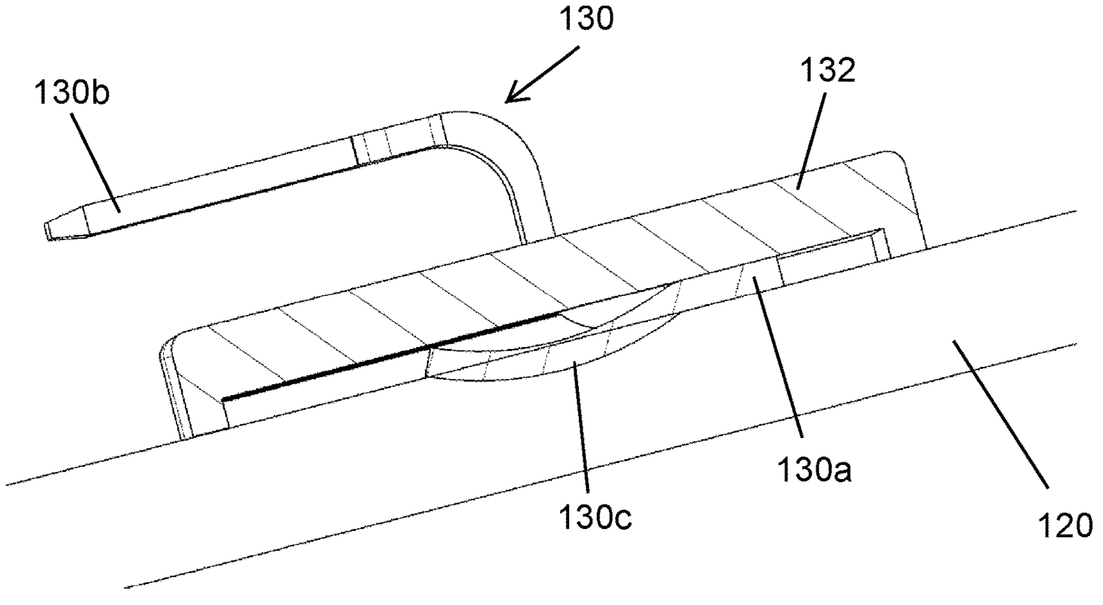
FIG. 8B is another sectional view of the electrical connector, taken along the line B-B in FIG. 8.

Optionally, the electrical connector comprises a metal electrical connector element that may be retained at the window panel and busbar via a bonding portion comprising a retaining cover or element (such as a plastic or polymeric retaining element or such as a metallic retaining element) that is adhesively bonded to the window panel and that retains the electrical connector at the window panel without use of solder at the electrical connection/joint. For example, and such as shown in FIGS. 7-8B, an electrical connector 130 is retained at the busbar 126 via a retaining element or cover element 132 that is adhesively bonded at the window panel 120 so as to retain the electrical connector 130 at the window panel 120 and to urge the electrical connector 130 into electrical connection with the busbar 126. The electrical connector 130 comprises a metal connector element (such as formed via a metal stamping process) having a base portion 130*a* and a connecting terminal 130*b*. The connecting terminal 130*b* is configured to electrically connect to a connecting element of the wire harness (such as a spade terminal configured to plug into a receiving terminal of the wire harness). The electrical connector 130 further comprises a busbar-connecting portion that comprises a pair of flexible tabs 130*c*. The tabs 130*c* are curved and biased toward an extended or curved state (as can be seen in FIGS. 7 and 8B).

The electrical connector 130 is placed at the busbar 126 with the base portion 130*a* of the electrical connector 130 at the window panel 120, such as at the glass surface and/or at the busbar 126 and with the tabs 130*c* pressed into engagement with the busbar 126 to establish electrically conductive connection thereat. With the electrical connector 130 placed at the window panel 120 (and optionally adhesively bonded thereat), the retaining element 132 is bonded to the window panel to retain the electrical connector 130 at the window panel 120 and busbar 126. The retaining element 132 is formed such that a gap size between an upper part or wall of the retaining element 132 (defined by the distance between the upper wall and an engaging edge or portion of the retaining element 132 that engages the window panel 120) generally corresponds to (or may be slightly smaller than) the thickness of the base portion 130*a* of the electrical connector 130. When the retaining element 132 is bonded at the window panel 120 and engages the base portion 130*a*, the tabs 130*c* contact the busbar 126 and are moved toward a flattened state (see FIG. 8A) and are urged against the busbar 126 due to the inherent biasing of the tabs toward the initial curved state of the tabs 130*c*. Thus, the retaining element 132 is adhesively bonded to the window panel 120 and the electrical connection of the electrical connector 130 at the busbar 126 is maintained and enhanced due to the bias of the tabs 130*c*. The tabs 130*c* are urged against the busbar 126 and electrically connect to the busbar 126 without use of solder at the electrical connection/joint. The retaining element 132 may be formed to snap attach at the electrical connector 130 to further enhance the retention of the electrical connector 130 at the busbar 126 and window panel 120. The retaining element or cover 132 may be bonded to the window panel 120 and/or busbar 126 via adhesive, such that there is no adhesive disposed between the tabs 130*c* and the busbar 126 and such that the electrical connection is made via direct metal-to-busbar contact.

Figure 9:
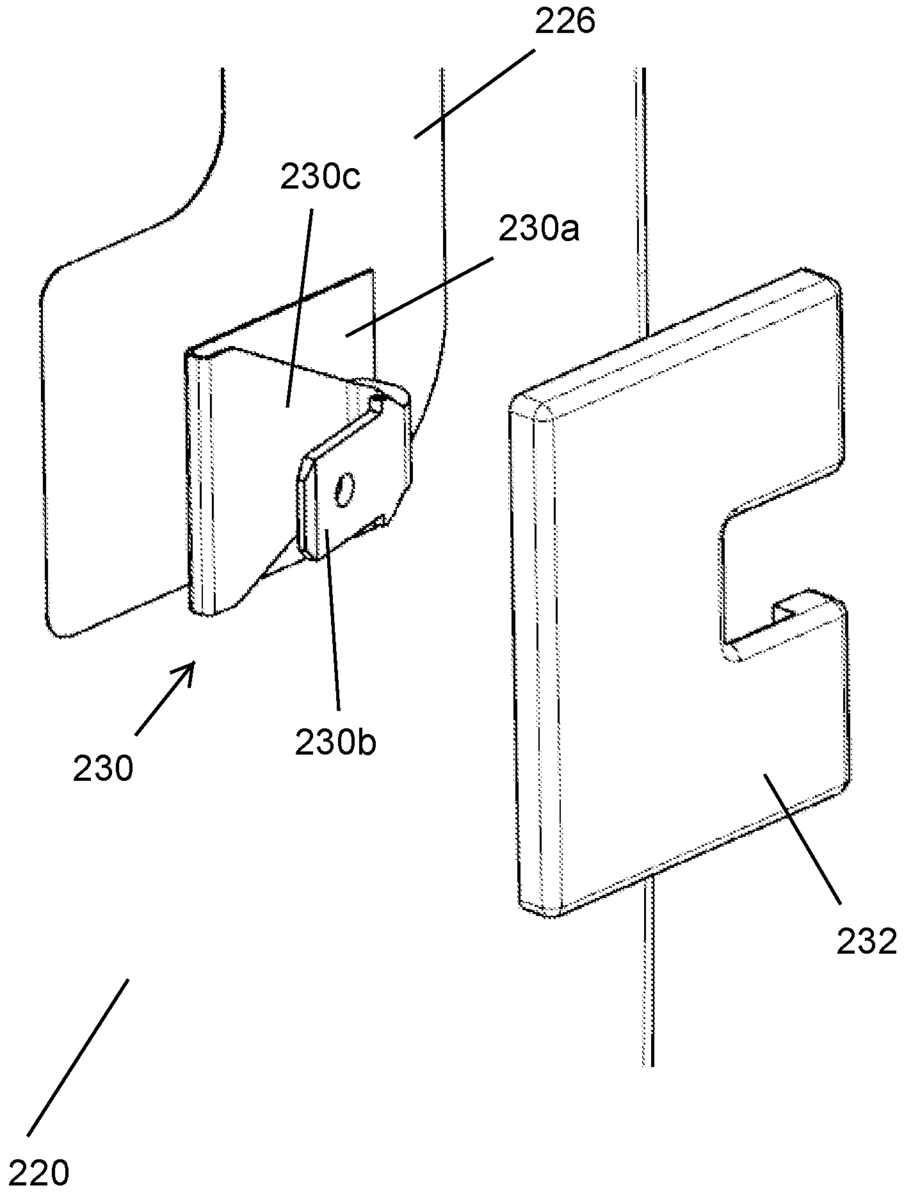
FIG. 9 is an exploded perspective view of another electrical connector, shown with a metal connector portion and a retaining cover.
Figure 10:
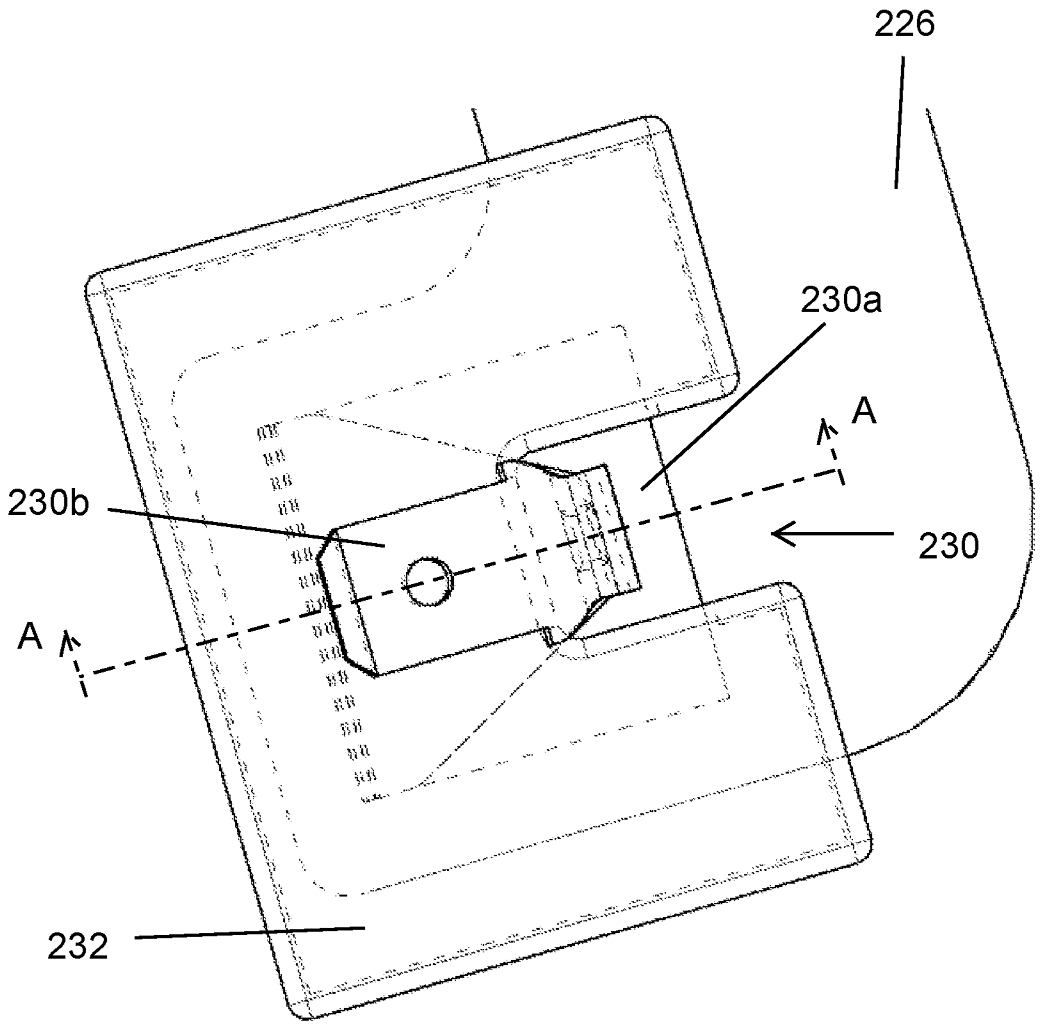
FIG. 10 is a plan view of the electrical connector of FIG. 9.

Optionally, the metal electrical connector element may comprise an electrically connecting base portion that electrically connects to the busbar when the retaining element is adhesively bonded at the electrical connector and at the window panel. For example, and with reference to FIGS. 9-11, an electrical connector 230 is retained at a busbar 226 via a retaining element or cover element 232 that is adhesively bonded at the window panel 220 so as to retain the electrical connector 230 at the window panel 220 and to urge the electrical connector 230 into electrical connection with the busbar 226. The electrical connector 230 comprises a metal connector element (such as formed via a metal stamping process) having a base portion 230*a* and a connecting terminal 230*b*. The metal connector element comprises a flexible U-shaped element that includes the base portion 230*a* and an outer portion. A busbar-connecting portion of the electrical connector 230 may comprise the base portion 230*a* of the metal electrical connector element. The connecting terminal 230*b* is configured to electrically connect to a connecting element of the wire harness (such as a spade terminal configured to plug into a receiving terminal of the wire harness). The base portion 230*a* is configured to electrically connect at the busbar 226 and is biased or urged toward and into engagement with the busbar 226 when the retaining element 232 is adhesively bonded at the window panel 220.

Figure 10A:
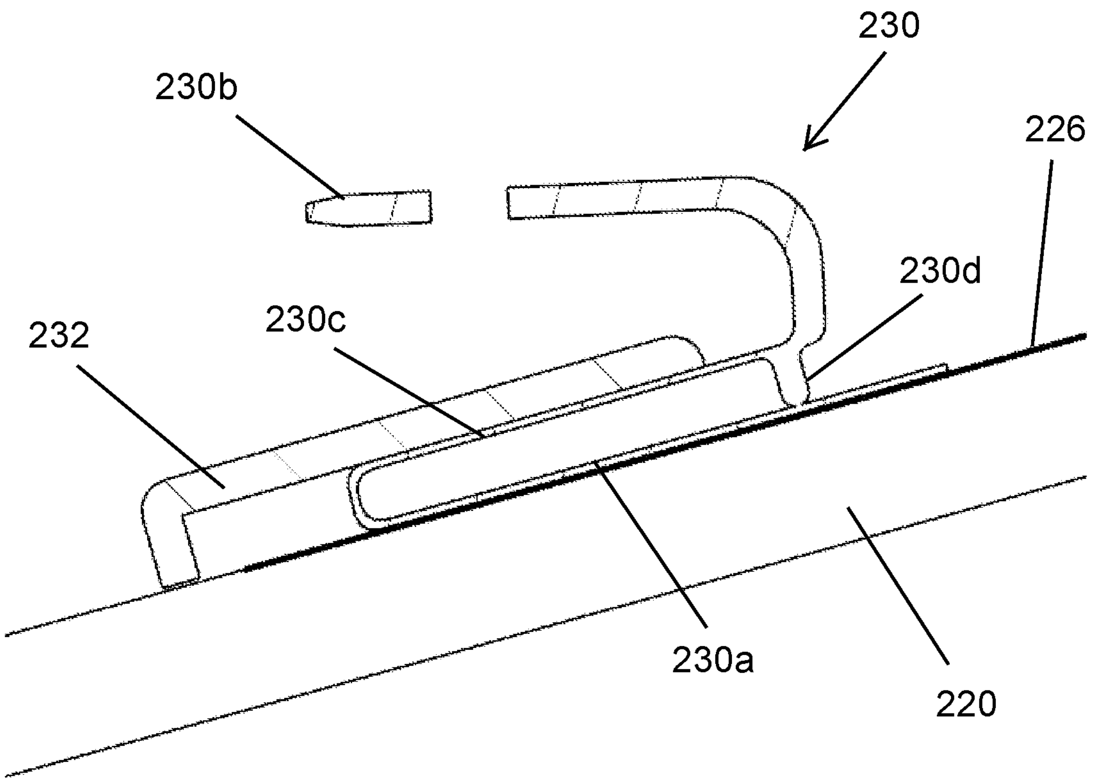
FIG. 10A is a sectional view of the electrical connector, taken along the line A-A in FIG. 10.
Figure 11:
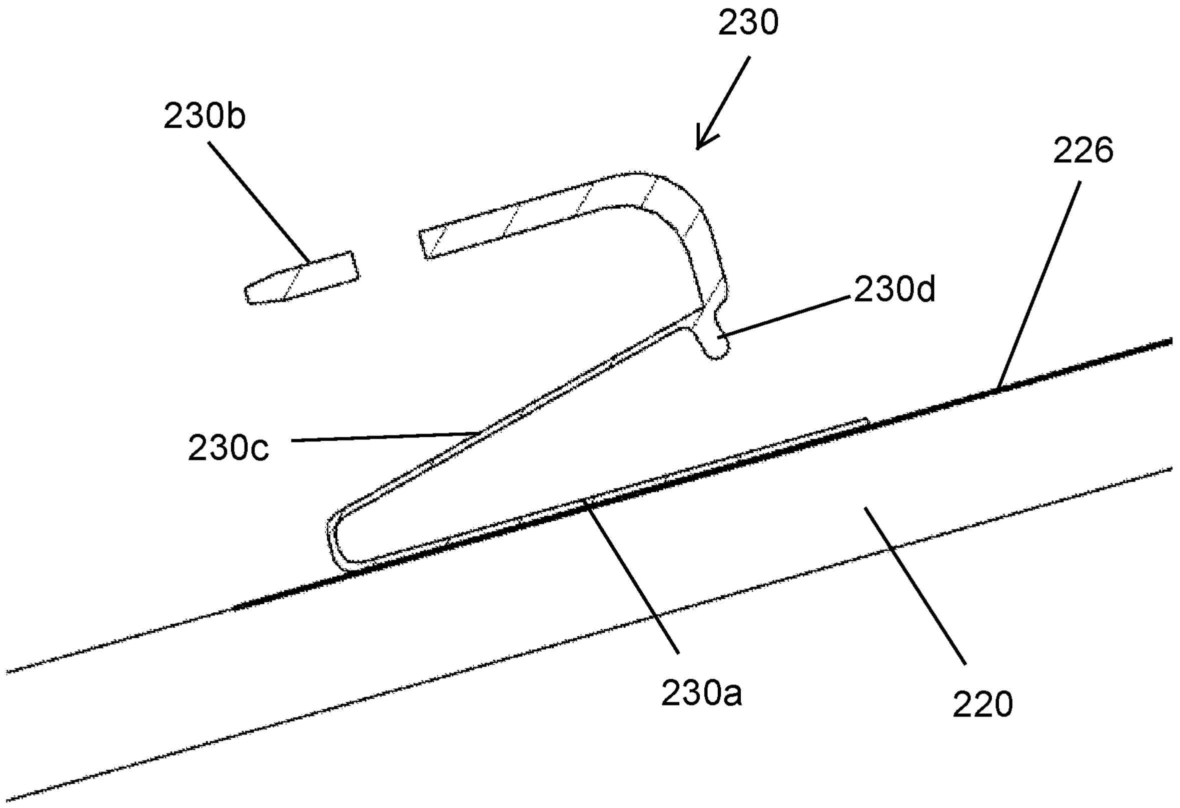
FIG. 11 is another sectional view of the electrical connector, shown with the retaining cover removed or not yet bonded to the glass window panel.
Figure 12:
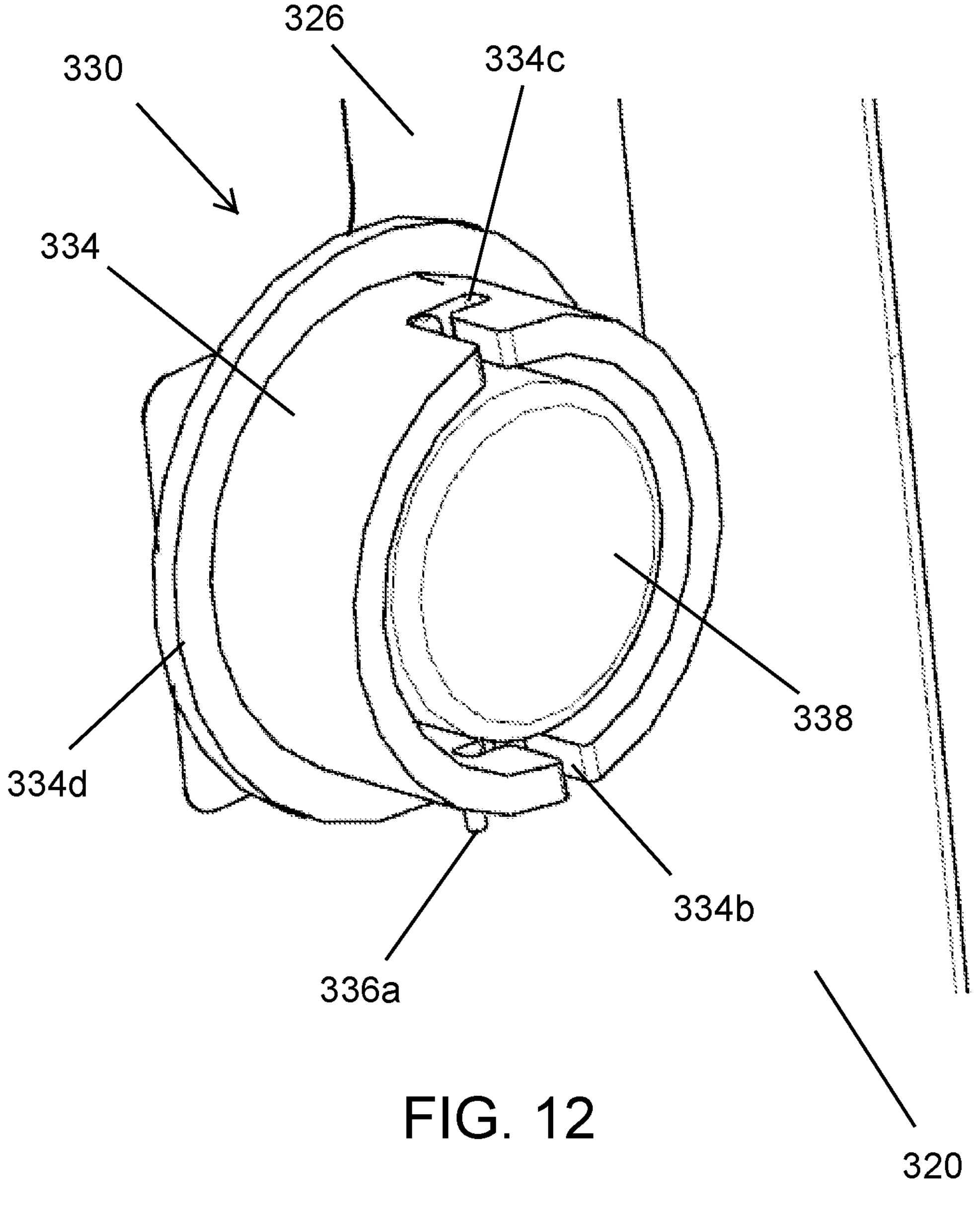
FIG. 12 is a perspective view of another electrical connector for solderless electrical connection to the busbar of the heater grid.

As best seen with reference to FIGS. 10A and 11, the electrical connector 230 comprises a bent and flexible metal element that has an upper part 230*c* that folds over the base portion 230*a*. The upper part 230*c* (or optionally the base portion) includes a tab or protrusion 230*d* that contacts the base portion 230*a* (or optionally the upper part) when the retaining element 232 is attached and presses the electrical connector 230 toward the window panel 220.

Thus, the electrical connector 230 is placed at the busbar 226 with the base portion 230*a* of the connector 230 pressed into engagement with the busbar 226 to establish electrically conductive connection thereat. With the electrical connector 230 placed at the window panel 220 (and optionally adhesively bonded thereat), the retaining element 232 is bonded to the window panel 220 to retain the electrical connector 230 at the window panel 220 and busbar 226. The retaining element 232 is formed such that a gap size between an upper part or wall 230*c* of the retaining element 232 (defined by the distance between the upper wall 230*c* and an engaging edge or portion of the retaining element 232 that engages the window panel 220) generally corresponds to (or may be slightly smaller than) the thickness of the base portion 230*a* and the upper part 230*c* as joined or spaced via the protrusion 230*d* (see FIG. 10). When the retaining element 232 is bonded at the window panel 220 and engages the upper part 230*c*, the base portion 230*a* is pressed against the busbar 226. Stated differently, the retaining element 232 presses the outer portion of the flexible U-shaped element toward the window panel as the retaining element 232 is bonded at the window panel, such that the base portion 230*a* is pressed into electrical connection with the busbar 226. The metal electrical connector element further comprises a stop element that electrically connects between the base portion 230*a* and the outer portion of the flexible U-shaped element when the retaining element 232 is bonded at the window panel 220.

Thus, the retaining element 232 is adhesively bonded to the window panel 220 and the electrical connection of the electrical connector 230 at the busbar 226 is maintained and enhanced due to the flexing of the electrical connector 230, which is thus urged against the busbar 226 and electrically connects to the busbar 226 without use of solder at the electrical connection/joint. The retaining element 232 may be formed to snap attach at the electrical connector 230 to further enhance the retention of the electrical connector 230 at the busbar 226 and window panel 220. The retaining element 232 may be bonded to the window panel 220 and/or busbar 226 via adhesive, and there may be no adhesive disposed between the base portion 230*a* and the busbar 226 and such that the electrical connection is made via direct metal-to-busbar contact.

Optionally, the electrical connector may comprise a spring-loaded connector that urges a busbar contacting or connecting portion of the electrical connector against the busbar via a biasing element or spring. For example, and with reference to FIGS. 12-16, an electrical connector 330 comprises a bonding or base portion 334 and a connecting portion or element 336 that is received in the base portion 334 and urged against a busbar 326 at the window panel 320 via a locking element 338 and a biasing element or spring 340. The base portion 334 is configured to adhesively attach or bond to the window panel 320 at the respective busbar 326 and includes a hollow passageway for receiving the connecting element 336 and the locking element 338.

Figure 13:
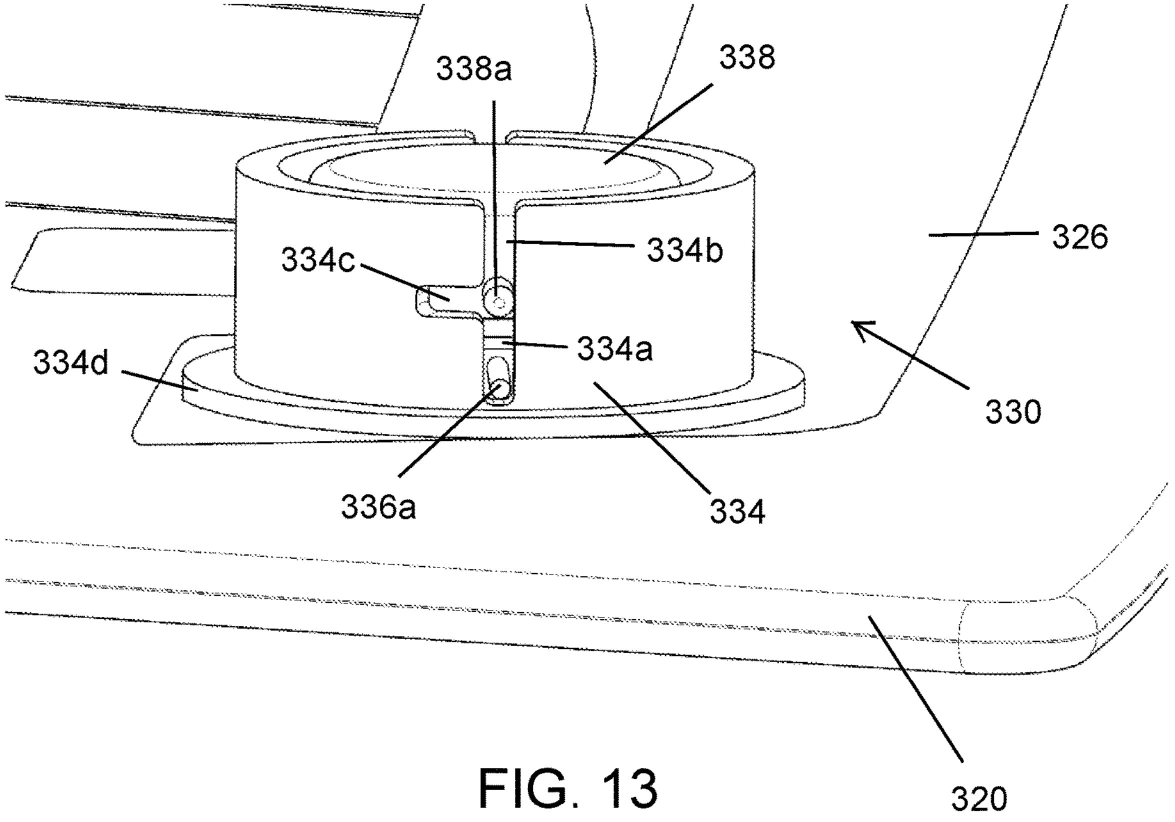
FIGS. 13 and 14 are side perspective views of the electrical connector of FIG. 12.
Figure 14:
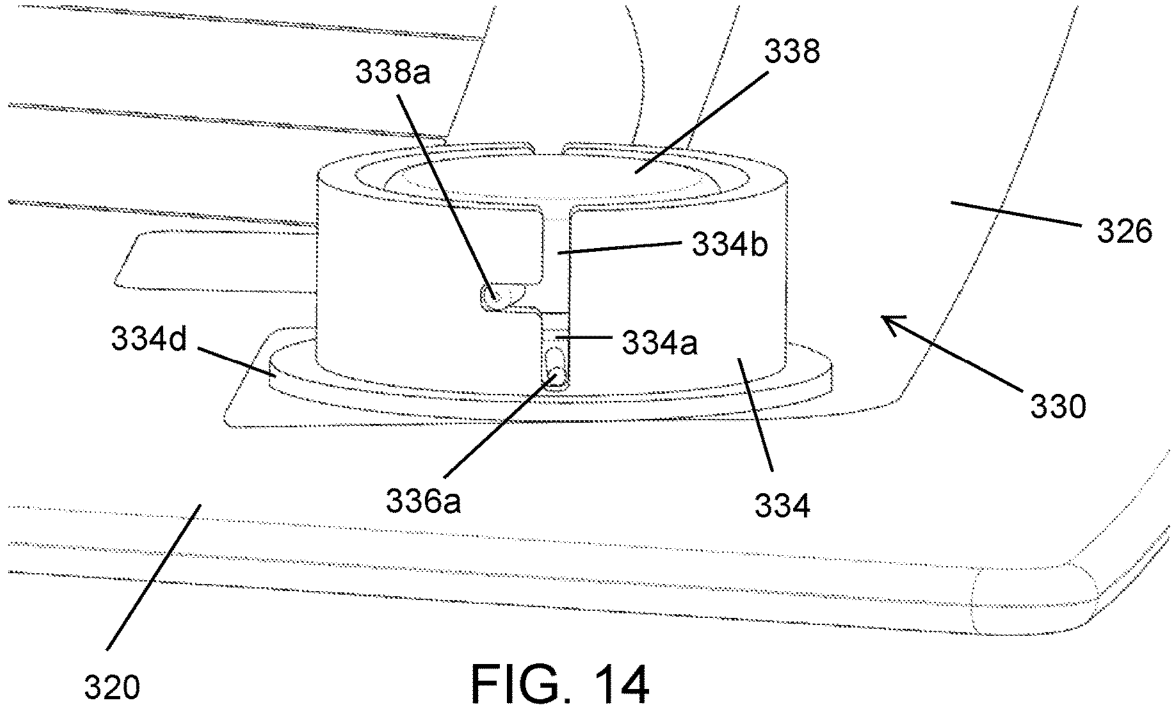

In the illustrated embodiment, the base portion 334 comprises a slotted element having a longitudinally oriented slot 334*a* for receiving an electrical wire or connecting terminal 336*a* of the connecting element 336 as the connecting element 336 is received in or inserted into and along the base portion 336. The base portion 334 also includes a longitudinally oriented slot or slots 334*b* for receiving a locking tab or tabs 338*a* of the locking element 338 for locking the locking element 338 at the base portion 334. The slots 334*a*, 334*b* may be the same slot (such as shown in FIGS. 13 and 14) or may be separate slots formed partially along the base portion 334. The base portion 334 further includes a radial slot 334*c* that intersects (and is generally transverse to) the longitudinal slots 334*b* that receive the locking tabs 338*a*.

Thus, the base portion 334 of the connector 330 is adhesively bonded to the window panel 320, such as at the glass surface and/or at the busbar 326. For example, the base portion 334 may include an attaching flange 334*d* at its base that is configured to be adhesively bonded at the glass surface and/or at the busbar 326. The base portion 334 comprises a generally cylindrical receiver that attaches at one end at the glass panel and that is open at the opposite or distal end for receiving the connecting element 336 and locking element 338 therein.

Figure 15:
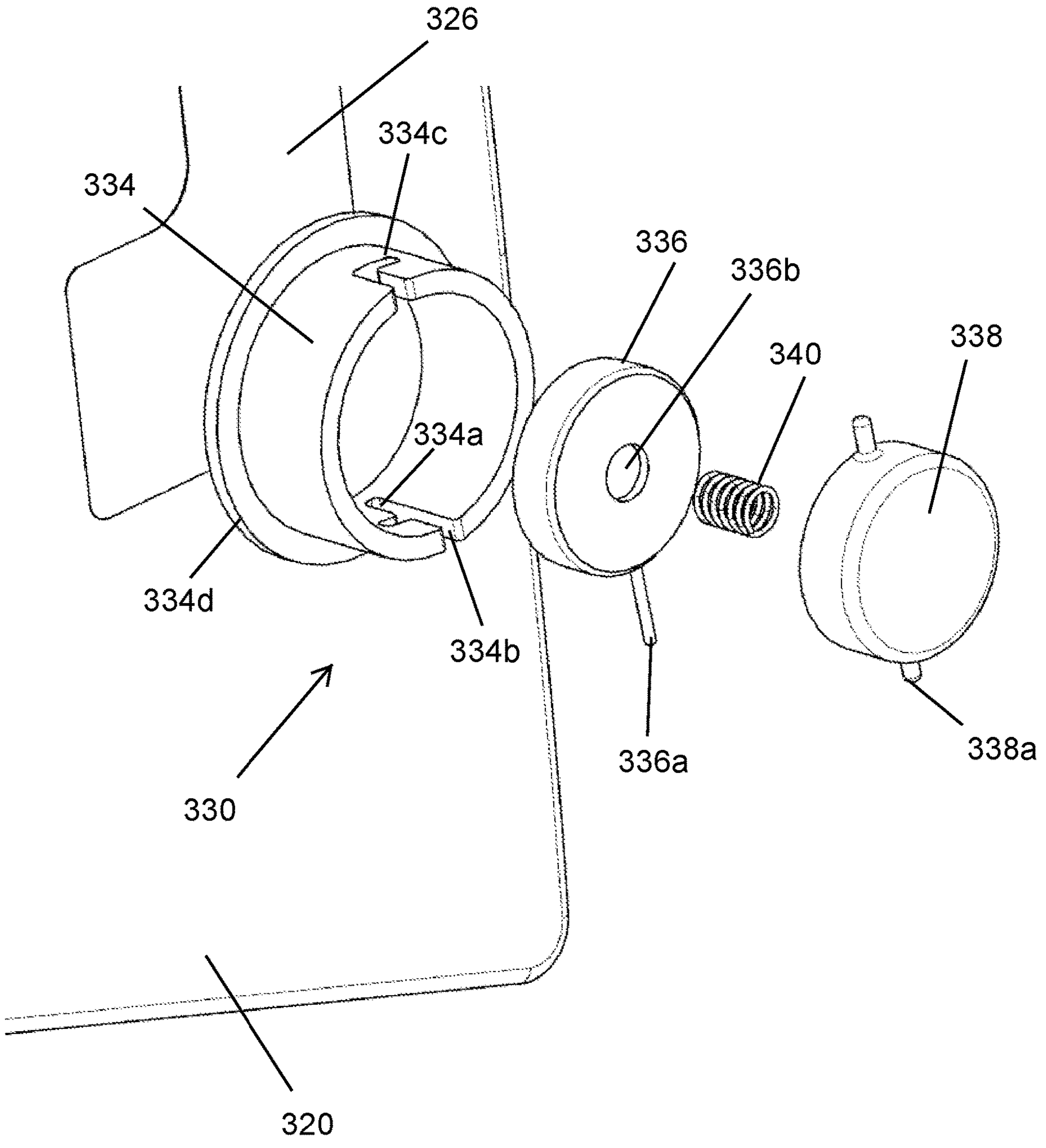
FIG. 15 is an exploded perspective view of the electrical connector of FIG. 12.
Figure 16:
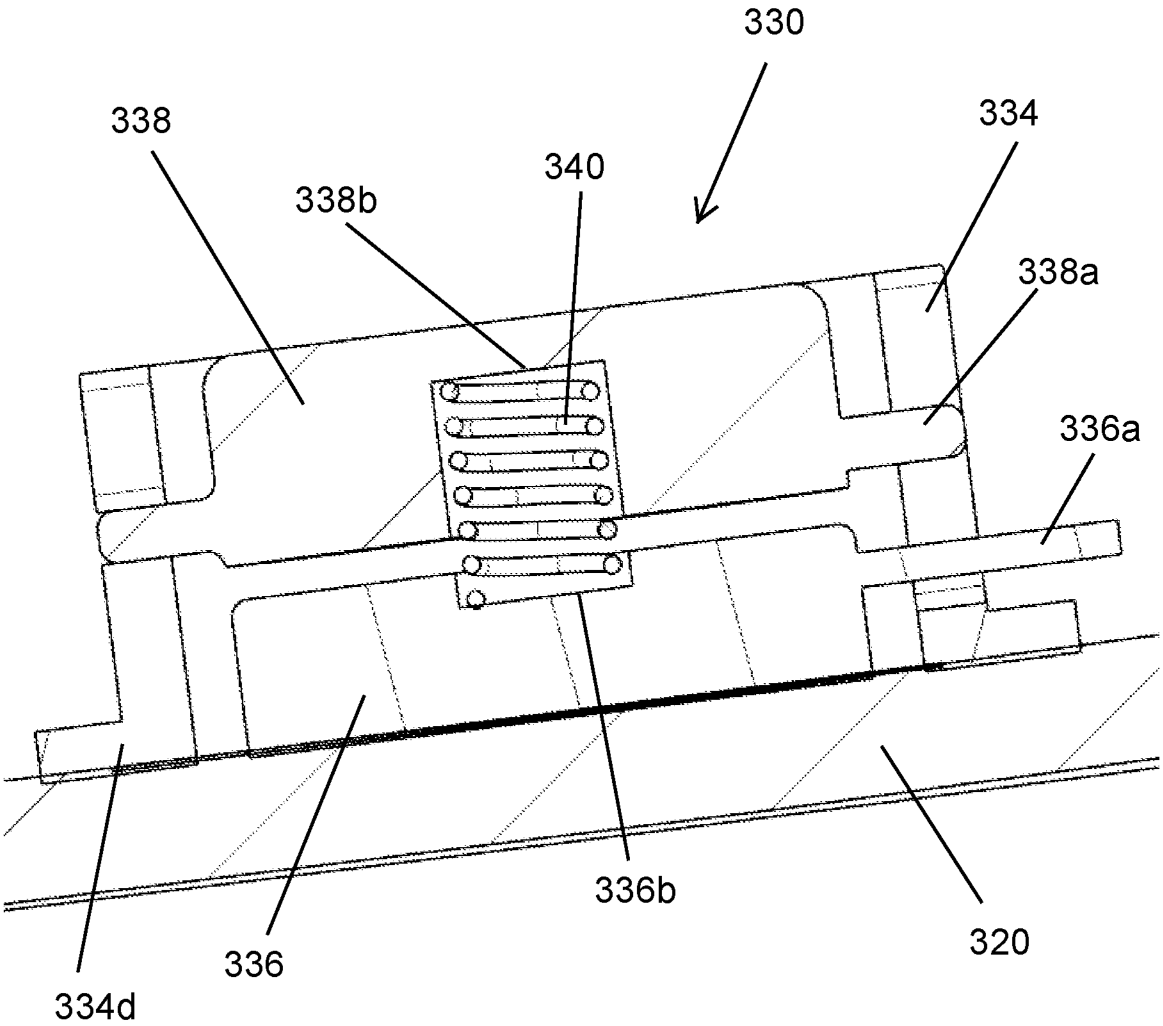
FIG. 16 is a sectional view of the electrical connector of FIG. 12.

When the base portion 334 is bonded at the window panel 320, the electrical connecting element 336 (such as a metal electrically conductive element or disc attached at the end of an electrically conductive terminal or wire electrically connected to the vehicle wire harness) is inserted into the base portion 334 with the wire 336*a* received along the slot 334*a* until the connecting element or disc 336 is at the busbar 326 and contacting the busbar 326. The locking element 338 is inserted into the base portion 334, with the tabs 338*a* received along the slots 334*b*, and with the spring 340 disposed between the locking element 338 and the connecting element 336. As shown in FIGS. 15 and 16, the connecting element 336 comprises a cylindrical recess 336*b* and the locking element 338 comprises a cylindrical recess 338*b* that cooperate to receive the spring 340 therein to maintain alignment of the spring 340.

When the locking element 338 is fully inserted into the base portion 334, with the spring 340 urging the connecting element 336 into engagement with the busbar 326, the locking element 338 is rotated or twisted relative to the base portion 334, whereby the tabs 338*a* move along the radial slots 334*c* (that are generally transverse to the longitudinal slots 334*b*) to lock or retain the locking element 338 at the base portion 334. With the locking element 338 retained at the base portion 334, the spring 340 urges the connecting element 336 away from the locking element 338 and toward and into engagement with the busbar 326, thereby maintaining electrical contact and electrical connection between the connecting element 336 and the busbar 326. The spring force of the spring 340 is selected to provide sufficient force and pressure of the connecting element 336 at the busbar 326 to maintain electrical connection at the busbar 326 with the window assembly installed at the vehicle and during operation of the vehicle.

Thus, the base portion 334 of the electrical connector 330 is adhesively bonded to the window panel 320 and the electrical connection of the connecting element 336 at the busbar 326 is maintained and enhanced due to the biasing force of the spring 340 and the locked position of the locking element 338. The connecting element 336 is thus urged or pressed against the busbar 326 and electrically connected to the busbar 326 without use of solder at the electrical connection/joint. The electrical connector 330 may be bonded to the window panel 320 and/or busbar 326 via adhesive at the base portion 334 only, such that there is no adhesive disposed between the electrically connecting element 336 and the busbar 326 and such that the electrical connection is made via direct metal-to-busbar contact.

The electrical connector is thus adhesively bonded at the window panel, such as by utilizing aspects of the bonding techniques and materials described in U.S. Pat. Nos. 5,853, 895 and/or 5,551,197, which are hereby incorporated herein by reference in their entireties. The portion of the electrical connector that is adhesively bonded at the window panel may be at or near or around the busbar portion at which the electrical connection is made.

The heater grids of the movable window panels are powered in a manner that allows for heating or defogging or defrosting of the movable window panel irrespective of whether the movable window panel is opened or partially opened or closed. For example, the electrical connection between the vehicle power source or fixed panel heater grid and the movable panel heater grid may comprise a flexible connector or wire or cable, while the fixed panel heater grid may be electrically connected to the other fixed panel heater grid via a jumper wire or cable, such as by utilizing aspects of the rear slider window assemblies described in U.S. Pat. Nos. 9,579,955; 8,881,458 and/or 8,402,695, which are hereby incorporated herein by reference in their entireties.

The window assembly includes two fixed window panels that are spaced apart so as to define an opening therebetween. The slider or movable window panel is movable along the lower rail and the upper rail of the frame portion to open and close the opening. Optionally, the slider window panel may be disposed at a lower carrier that receives the lower perimeter edge region of the slider window panel therein and that is slidably or movably received in the lower rail of frame portion. The two fixed window panels may comprise two separate panels with upper and lower appliques disposed above and below the aperture, or the two fixed window panels may be part of a single hole-in-glass window panel with the aperture formed therethrough.

The movable or slider window panel may be movable such as via manual pushing or pulling at the window panel or in response to actuation of a drive motor of a drive motor assembly or system, which may move cables or the like to impart horizontal movement of the slider window panel along the rails. Optionally, the drive motor assembly may utilize aspects of the drive assemblies of the types described in U.S. Pat. Nos. 4,920,698; 4,995,195; 5,146,712; 5,531,046; 5,572,376; 6,119,401; 6,955,009; 7,073,293 and/or 10,501,977, and/or U.S. Publication Nos. US-2019-0383084; US-2008-0127563 and/or US-2004-0020131, which are all hereby incorporated herein by reference in their entireties.

Optionally, the window assembly or assemblies of the present disclosure may utilize aspects of the window assemblies described in U.S. Pat. Nos. 8,402,695; 8,322,073; 7,838,115; 7,332,225; 7,073,293; 7,003,916; 6,846,039; 6,691,464; 6,319,344; 6,068,719 and 5,853,895, and/or U.S. Publication Nos. US-2013-0174488; US-2011-0056140; US-2006-0107600; US-2008-0127563; US-2004-0020131 and/or US-2003-0213179, which are hereby incorporated herein by reference in their entireties. Although shown and described as a horizontally movable center window that moves relative to a pair of opposite side windows (such as for applications at the rear of a cab of a pickup truck or the like), it is envisioned that aspects of the present disclosure are applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like).

Although shown and described as a rear slider window assembly, such as for a pickup truck, aspects of the present disclosure are suitable for use on other vehicular window assemblies, such as rear window assemblies of vehicles that are fixed window panels (having mounting structure that is configured to mount or attach or bond at an opening at a rear of a vehicle) or that are openable window panels (such as hinged liftgates or the like). For example, the window assembly may comprise a fixed rear window or backlite for a pickup truck or sedan or SUV or the like, or may comprise a movable side window or a fixed side window or a quarter window or the like, with the electrical connectors providing electrical connection to electrically conductive elements at the window panel (such as electrically conductive traces for heater grids or electrically conductive traces for electrically powering other elements at the window panel(s), such as lights or cameras or the like), without use of solder.

Changes and modifications to the specifically described embodiments may be carried out without departing from the principles of the present invention, which is intended to be limited only by the scope of the appended claims, as interpreted according to the principles of patent law.

The invention claimed is:

1. A vehicular window assembly, the vehicular window assembly comprising:

a window panel having an inner surface and an outer surface;

electrically conductive traces established at the inner surface of the window panel;

a pair of busbars established at the inner surface and in electrical connection with respective portions of the electrically conductive traces;

an electrical connector affixed at each busbar and configured to electrically connect to a wire harness of a vehicle when the vehicular window assembly is installed at the vehicle;

wherein each electrical connector comprises a bonding portion, a connecting terminal and a busbar-connecting portion;

wherein the connecting terminal of each electrical connector is configured to electrically connect to a respective connector of the wire harness of the vehicle;

wherein the bonding portion of each electrical connector is adhesively bonded at the window panel to affix the electrical connector at a respective busbar;

wherein, as the bonding portion of each electrical connector is adhesively bonded at the window panel, the busbar-connecting portion of the electrical connector flexes relative to the bonding portion of the electrical connector and is biased toward engagement with the respective busbar;

wherein, with the bonding portion of each electrical connector adhesively bonded at the window panel, the busbar-connecting portion of the electrical connector is pressed into engagement with the respective busbar and makes direct contact with the respective busbar to maintain electrical connection to the respective busbar; and wherein the electrical connectors are bonded at the window panel with the busbar-connecting portions electrically connected to the respective busbars without use of solder.

2. The vehicular window assembly of claim 1, wherein each electrical connector comprises a metal electrical connector.

3. The vehicular window assembly of claim 2, wherein the bonding portion of each electrical connector comprises a base portion of the metal electrical connector, and wherein the busbar-connecting portion of each electrical connector comprises at least one flexible tab that flexes as the bonding portion of the electrical connector is bonded at the window panel and that is biased toward its initial state to maintain electrical connection to the respective busbar.

4. The vehicular window assembly of claim 1, wherein each electrical connector comprises a metal electrical connector element and a retaining element, and wherein the bonding portion of the electrical connector comprises the retaining element.

5. The vehicular window assembly of claim 4, wherein the busbar-connecting portion of each electrical connector comprises at least one flexible tab of the metal electrical connector element that flexes as the retaining element of the electrical connector is bonded at the window panel and that is biased toward its initial state to maintain electrical connection to the respective busbar.

6. The vehicular window assembly of claim 5, wherein the at least one flexible tab extends from a base portion of the metal electrical connector element, and wherein the retaining element of the electrical connector presses the base portion against the window panel when the retaining element of the electrical connector is bonded at the window panel.

7. The vehicular window assembly of claim 4, wherein the metal electrical connector element comprises a flexible U-shaped element having a base portion and an outer portion, and wherein the busbar-connecting portion of each electrical connector comprises the base portion of the metal electrical connector element, and wherein the retaining element of the electrical connector presses the outer portion toward the window panel as the retaining element is bonded at the window panel such that the base portion is pressed into electrical connection with the respective busbar.

8. The vehicular window assembly of claim 7, wherein the metal electrical connector element comprises a stop element that electrically connects between the base portion and the outer portion when the retaining element of the electrical connector is bonded at the window panel.

9. The vehicular window assembly of claim 1, wherein the bonding portion of each electrical connector is configured to receive the respective connecting terminal therein, and wherein the busbar-connecting portion of each electrical connector is pressed into electrical connection with the respective busbar via a retaining element that is securable to the bonding portion.

10. The vehicular window assembly of claim 9, wherein the bonding portion of each electrical connector comprises a cylindrical receiver having a longitudinal slot at least partially therealong, and wherein one end of the cylindrical receiver of the electrical connector is adhesively bonded at the window panel, and wherein the busbar-connecting portion of the electrical connector is received in the cylindrical receiver at an opposite end of the cylindrical receiver with the connecting terminal received along the longitudinal slot.

11. The vehicular window assembly of claim 10, wherein the retaining element is received in the cylindrical receiver at the opposite end, with a tab of the retaining element received along a respective longitudinal slot, and wherein the cylindrical receiver comprises a radial slot at the longitudinal slot that allows for rotation of the retaining element within the cylindrical receiver, which moves the tab into the radial slot to limit longitudinal movement of the retaining element relative to the cylindrical receiver.

12. The vehicular window assembly of claim 11, wherein each electrical connector comprises a biasing element disposed between the retaining element and the busbar-connecting portion, and wherein the biasing element urges the busbar-connecting portion of the electrical connector away from the retaining element and toward and into engagement with the respective busbar when the retaining element is received in the cylindrical receiver and rotated to move the tab into the radial slot.

13. The vehicular window assembly of claim 1, wherein the vehicular window assembly comprises a slider window assembly having a fixed window panel, a frame portion affixed at the fixed window panel and having an upper rail and a lower rail, and a movable window panel that is movable along the upper and lower rails, and wherein the movable window panel is movable between a closed position and an opened position, and wherein the electrically conductive traces and the busbars are established at the fixed window panel.

14. A vehicular window assembly, the vehicular window assembly comprising:

a window panel having an inner surface and an outer surface;

electrically conductive traces established at the inner surface of the window panel;

a pair of busbars established at the inner surface and in electrical connection with respective portions of the electrically conductive traces;

an electrical connector affixed at each busbar and configured to electrically connect to a wire harness of a vehicle when the vehicular window assembly is installed at the vehicle;

wherein each electrical connector comprises a metal electrical connector element and a retaining element;

wherein the metal electrical connector element of each electrical connector comprises a connecting terminal and a busbar-connecting portion;

wherein the connecting terminal of the metal electrical connector element is configured to electrically connect to a respective connector of the wire harness of the vehicle;

wherein the retaining element of each electrical connector is adhesively bonded at the window panel to affix the electrical connector at a respective busbar;

wherein, as the retaining element of each electrical connector is adhesively bonded at the window panel, the busbar-connecting portion of the electrical connector flexes relative to the retaining element of the electrical connector and is biased toward engagement with the respective busbar;

wherein, with the retaining element of each electrical connector adhesively bonded at the window panel, the busbar-connecting portion of the respective metal electrical connecting element is pressed into engagement with the respective busbar and makes direct contact with the respective busbar to maintain electrical connection to the respective busbar; and wherein the retaining elements are bonded at the window panel with the busbar-connecting portions electrically connected to the respective busbars without use of solder.

15. The vehicular window assembly of claim 14, wherein the busbar-connecting portion of the metal electrical connector element of each electrical connector comprises at least one flexible tab that (i) flexes as the retaining element of the electrical connector presses the busbar-connecting portion into engagement with the respective busbar and is bonded at the window panel and (ii) is biased toward its initial state to maintain electrical connection to the respective busbar.

16. The vehicular window assembly of claim 15, wherein the at least one flexible tab extends from a base portion of the metal electrical connector element of each electrical connector, and wherein the retaining element of the electrical connector presses the base portion against the window panel when the retaining element is bonded at the window panel.

17. The vehicular window assembly of claim 14, wherein the metal electrical connector element of each electrical connector comprises a flexible U-shaped element having a base portion and an outer portion, and wherein the busbar-connecting portion comprises the base portion of the metal electrical connector element, and wherein the retaining element presses the outer portion toward the window panel as the retaining element of the electrical connector is bonded at the window panel such that the base portion is pressed into electrical connection with the respective busbar.

18. The vehicular window assembly of claim 17, wherein the metal electrical connector element of each electrical connector comprises a stop element that electrically connects between the base portion and the outer portion when the retaining element of the electrical connector is bonded at the window panel.

19. A vehicular window assembly, the vehicular window assembly comprising:

a window panel having an inner surface and an outer surface;

electrically conductive traces established at the inner surface of the window panel;

a pair of busbars established at the inner surface and in electrical connection with respective portions of the electrically conductive traces;

an electrical connector affixed at each busbar and configured to electrically connect to a wire harness of a vehicle when the vehicular window assembly is installed at the vehicle;

wherein each electrical connector comprises a bonding portion, a connecting terminal and a busbar-connecting portion;

wherein the connecting terminal of each electrical connector is configured to electrically connect to a respective connector of the wire harness of the vehicle;

wherein the bonding portion of each electrical connector is configured to receive the connecting terminal of the electrical connector therein;

wherein the bonding portion of each electrical connector is adhesively bonded at the window panel to affix the electrical connector at a respective busbar;

wherein each electrical connector comprises a retaining element that is securable to the bonding portion and makes direct contact with the respective busbar;

wherein, as the retaining element of each electrical connector is secured to the bonding portion, the busbar-connecting portion of the electrical connector flexes relative to the retaining element of the electrical connector and is biased toward engagement with the respective busbar;

wherein, with the bonding portion of each electrical connector adhesively bonded at the window panel, the busbar-connecting portion of the electrical connector is pressed into electrical connection with the respective busbar via the retaining element of the electrical connector that is secured to the bonding portion of the electrical connector and makes direct contact with the respective busbar;

wherein the bonding portion of each electrical connector comprises a cylindrical receiver having a longitudinal slot at least partially therealong, and wherein one end of the cylindrical receiver is adhesively bonded at the window panel, and wherein the busbar-connecting portion of the electrical connector is received in the cylindrical receiver at an opposite end of the cylindrical receiver with the connecting terminal received along the longitudinal slot;

wherein the retaining element is received in the cylindrical receiver at the opposite end, with a tab of the retaining element received along a respective longitudinal slot, and wherein the cylindrical receiver comprises a radial slot at the longitudinal slot that allows for rotation of the retaining element within the cylindrical receiver, which moves the tab into the radial slot to limit longitudinal movement of the retaining element relative to the cylindrical receiver; and wherein the electrical connectors are bonded at the window panel with the busbar-connecting portions electrically connected to the respective busbars without use of solder.

20. The vehicular window assembly of claim 19, wherein each electrical connector comprises a biasing element disposed between the retaining element of the electrical connector and the busbar-connecting portion of the electrical connector, and wherein the biasing element urges the busbar-connecting portion of the electrical connector away from the retaining element of the electrical connector and toward and into engagement with the respective busbar when the retaining element is received in the cylindrical receiver and rotated to move the tab into the radial slot.

* * * * *